US009983345B2

(12) United States Patent
Dau et al.

(10) Patent No.: US 9,983,345 B2
(45) Date of Patent: May 29, 2018

(54) LUMINAIRE WITH LUMINAIRE MODULE

(71) Applicant: Quarkstar LLC, Las Vegas, NV (US)

(72) Inventors: Wilson Dau, Victoria (CA); Allan Brent York, Langley (CA); Louis Lerman, Las Vegas, NV (US); Ferdinand Schinagl, North Vancouver (CA); Hans Peter Stormberg, Stolberg (CA)

(73) Assignee: Quarkstar LLC, Las Vegas, NV (US)

( * ) Notice: Subject to any disclaimer, the term of this patent is extended or adjusted under 35 U.S.C. 154(b) by 58 days.

(21) Appl. No.: 15/022,902

(22) PCT Filed: Sep. 17, 2014

(86) PCT No.: PCT/US2014/056157
§ 371 (c)(1),
(2) Date: Mar. 17, 2016

(87) PCT Pub. No.: WO2015/042186
PCT Pub. Date: Mar. 26, 2015

(65) Prior Publication Data
US 2016/0282543 A1 Sep. 29, 2016

Related U.S. Application Data

(60) Provisional application No. 61/878,764, filed on Sep. 17, 2013.

(51) Int. Cl.
F21V 7/04 (2006.01)
F21V 8/00 (2006.01)
(Continued)

(52) U.S. Cl.
CPC .............. *G02B 6/0055* (2013.01); *F21K 9/61* (2016.08); *F21S 8/026* (2013.01); *F21V 7/0016* (2013.01);
(Continued)

(58) Field of Classification Search
CPC . F21K 9/61; F21K 9/52; F21V 7/0016; F21V 7/0091; G02B 6/0045;
(Continued)

(56) References Cited

U.S. PATENT DOCUMENTS 6,789,914 B1 * 9/2004 Brown ..................... F21S 8/02
362/147
2008/0204888 A1 * 8/2008 Kan ......................... F21S 8/026
359/629

(Continued)

FOREIGN PATENT DOCUMENTS

WO WO2010042423 A3 7/2010
WO WO2012024607 A3 4/2012

OTHER PUBLICATIONS

Notification of Transmittal of the International Search Report and the Written Opinion of the International Searching Authority, International Application No. PCT/US2014/056157, dated Jan. 21, 2015, 9 pages.

*Primary Examiner* — Laura Gudorf
(74) *Attorney, Agent, or Firm* — Fish & Richardson P.C.

(57) ABSTRACT

The present technology relates to luminaires including a housing and a luminaire module disposed within the housing, where the housing has apertures through which light that is output by the luminaire module exits the luminaire towards one or more target areas.

24 Claims, 8 Drawing Sheets

(51) Int. Cl.
*F21V 7/00* (2006.01)
*F21K 9/61* (2016.01)
*G02B 19/00* (2006.01)
*F21S 8/02* (2006.01)
*F21Y 101/00* (2016.01)
*F21Y 103/10* (2016.01)
*F21Y 115/10* (2016.01)

(52) U.S. Cl.
CPC ............ *F21V 7/0091* (2013.01); *G02B 6/005* (2013.01); *G02B 6/0023* (2013.01); *G02B 6/0031* (2013.01); *G02B 6/0035* (2013.01); *G02B 6/0045* (2013.01); *G02B 6/0046* (2013.01); *G02B 6/0085* (2013.01); *G02B 6/0096* (2013.01); *G02B 19/00* (2013.01); *F21Y 2101/00* (2013.01); *F21Y 2103/10* (2016.08); *F21Y 2115/10* (2016.08)

(58) Field of Classification Search
CPC .. G02B 6/0023; G02B 6/0031; G02B 6/0035; G02B 6/3346; G02B 6/005; G02B 6/0055; G02B 6/0085; G02B 6/0096
See application file for complete search history.

(56) References Cited

U.S. PATENT DOCUMENTS

| | | | |
|---|---|---|---|
| 2009/0296407 A1* | 12/2009 | Bailey | F21V 5/04 362/309 |
| 2012/0020066 A1 | 1/2012 | Chang | |
| 2013/0201715 A1 | 8/2013 | Dau | |
| 2013/0258699 A1* | 10/2013 | Weaver | F21K 9/54 362/555 |
| 2016/0018064 A1* | 1/2016 | Jurik | F21S 8/00 362/231 |

* cited by examiner

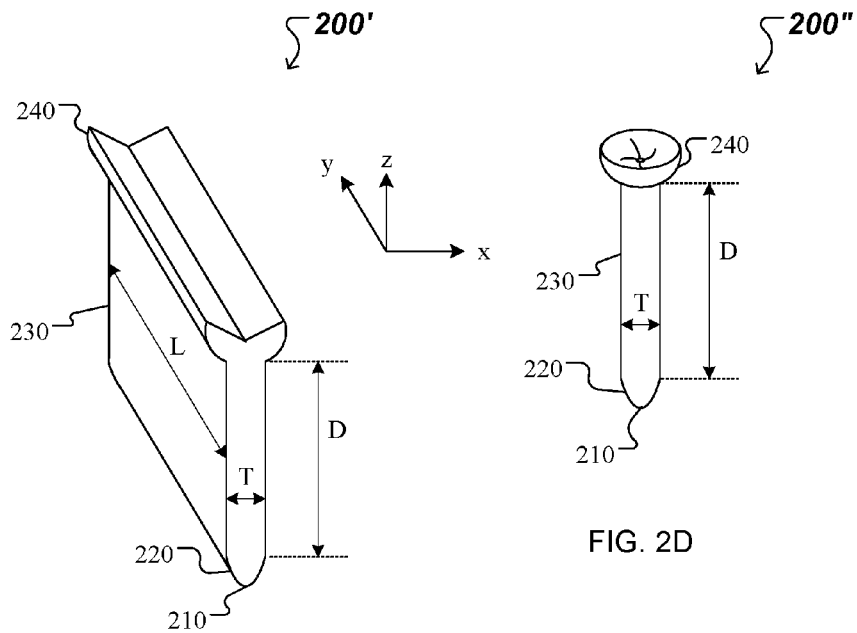
FIG. 2C
FIG. 2D
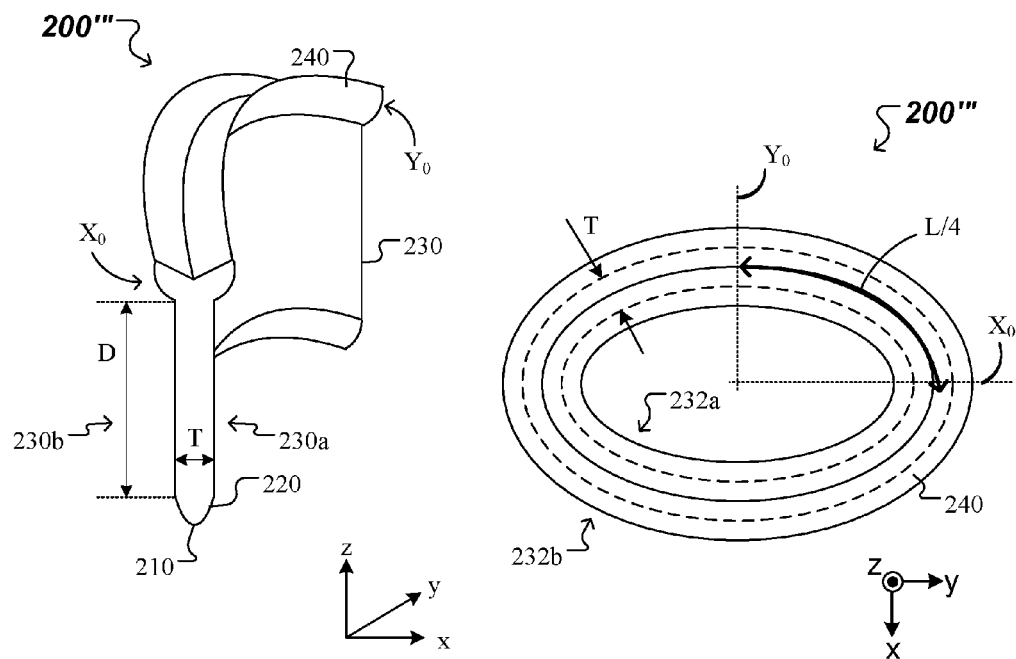
FIG. 2E
FIG. 2F

LUMINAIRE WITH LUMINAIRE MODULE

CROSS-REFERENCE TO RELATED APPLICATION

This application is a U.S. National Stage of International Application No. PCT/US2014/056157, filed Sep. 17, 2014, which claims benefit under 35 U.S.C. § 119(e)(1) to U.S. Provisional Application No. 61/878,764, filed on Sep. 17, 2013, the entire contents of which are incorporated by reference herein.

TECHNICAL FIELD

Technologies related to solid-state luminaires and in particular to lighting devices that are configured as a luminaire with a luminaire module are described herein.

BACKGROUND

Conventional lighting systems in the lighting field commonly harness fairly spatially homogeneous sources within optical systems. The light sources are often fairly bright (source luminance), and the conventional lighting systems are often provided with a single reflector system to collect the light flux and direct it in a semi-controlled fashion, or via secondary reflector/diffuser systems, towards a target area. Conventional lighting systems often retain a Lambertian diffuser/reflective surface in the system such that a direct view of the Lambertian source is retained in at least one field of view. This gives rise, at certain angles, to glare with the problem increasing in time with ever brighter Light Emitting Diode (LED) sources.

SUMMARY

The present technology relates generally to solid-state luminaires and in particular to lighting devices that are configured as a luminaire with a luminaire module.

A variety of luminaires are disclosed that are configured to manipulate light provided by one or more light-emitting elements (LEEs). The components of the luminaire can be configured in a variety of ways so a variety of intensity distributions can be output by the luminaire. Such luminaires can be configured to provide light for particular lighting applications, including office lighting, task lighting, cabinet lighting, garage lighting, wall wash, stack lighting, and down-lighting.

Various aspects of the invention are summarized as follows.

In general, in a first aspect, the invention features a luminaire including a housing having a first face with a first aperture; one or more luminaire modules arranged within the housing, where each module includes one or more light-emitting elements (LEEs) disposed on one or more substrates and adapted to emit light in a first direction; a light guide including an input end and an output end, and side surfaces extending from the input end to the output end, the side surfaces being shaped to guide light emitted by the one or more LEEs and received at the input end of the light guide in the first direction to the output end of the light guide and provide guided light at the output end of the light guide; and an optical extractor optically coupled with the output end of the light guide and adapted to receive the guided light, the optical extractor having a first redirecting surface and a first output surface, the first redirecting surface of the optical extractor being adapted to reflect at least a portion of the guided light received at the optical extractor towards the first output surface and output redirected light from the first output surface of the optical extractor in a second direction opposing the first direction, where light output by the optical extractor through the first output surface in the second direction passes through the first aperture into an ambient environment as first light output by the luminaire.

The foregoing and other embodiments can each optionally include one or more of the following features, alone or in combination. In some implementations, the one or more substrates can be coupled with the first face of the housing. In some implementations, the optical extractor can include a second redirecting surface and a second output surface on an opposite side of an optical axis of the light guide relative to the first output surface, the second redirecting surface of the optical extractor can be adapted to reflect at least a portion of the light received at the optical extractor towards the second output surface and output redirected light from the second output surface of the optical extractor in the second direction, and the first face can have a second aperture where light output by the optical extractor through the second output surface in the second direction can pass through the second aperture into the ambient environment as second light output by the luminaire.

In some implementations, the housing can include a second face opposing the first face, such that the optical extractor is adjacent to the second face. In some implementations, the housing can include one or more side faces extending from the first face along the first direction. In some implementations, the luminaire can further include a first reflector having a first reflective surface, where the first reflective surface can be configured to reflect at least a portion of light that is output from the first output surface of the optical extractor towards the first aperture in the second direction as reflected light. In some implementations, the first reflector can include a second reflective surface opposing the first reflective surface.

In some implementations, the housing can be recessed in a ceiling such that the first face of the housing is parallel to the ceiling. In some implementations, the first face can be within a plane of the ceiling. In some implementations, the luminaire can further include a second reflector having a third reflective surface, where the third reflective surface can be configured to reflect at least a portion of light that is output from the second output surface of the optical extractor towards the second aperture in the second direction as reflected light. In some implementations, the second reflector can include a fourth reflective surface opposing the third reflective surface.

In some implementations, the luminaire can further include an optical element disposed in at least a portion of at least one of the first or second aperture. In some implementations, the optical element can be configured to diffuse light. In some implementations, the luminaire can further include an optical element disposed in at least a portion of at least one of the first or second aperture, where the optical element can be configured to refract light. In some implementations, at least a portion of at least one of the first or second reflective surface can be specular reflective. In some implementations, the light guide and at least one of the first or second reflectors can be configured to mix the light emitted by the one or more LEEs to provide a substantially uniform output light at the first aperture or at the first and second apertures.

In some implementations, the output light can have an isotropic color distribution. In some implementations, the output light can have a uniform intensity distribution along a direction parallel to the planar side surfaces of the light guide. In some implementations, the light guide can include a solid transparent material and the side surfaces can be configured to guide light via TIR. In some implementations, the light guide can be hollow and the side surfaces can be reflectors configured to guide light via specular reflection. In some implementations, the luminaire can further include one or more couplers positioned to receive a portion of the light emitted by corresponding one or more LEEs and can be adapted to at least partially collimate the received portion of the light, where the one or more couplers can be positioned to provide collimated light to the input end of the light guide.

The details of one or more implementations of the technologies described herein are set forth in the accompanying drawings and the description below. Other features, aspects, and advantages of the disclosed technologies will become apparent from the description, the drawings, and the claims.

BRIEF DESCRIPTION OF THE DRAWINGS

FIG. 2C is perspective view of another example of an elongated luminaire module with a light guide and an optical extractor.

FIG. 2D is a perspective view of an example of a rotationally symmetric light guide luminaire module.

FIGS. 2E-2F are views of an example of an elongated luminaire module with curved light guide and bidirectional optical extractor.

Reference numbers and designations in the various drawings indicate exemplary aspects of implementations of particular features of the present disclosure.

DETAILED DESCRIPTION

The technologies described herein provide luminaires that can provide areas of illumination and respective intensity vectors within an illuminated environment to create a desired illumination distribution. Light that is emitted by light-emitting elements (LEEs) can be harnessed and create a virtual light source with properties that can result in compact luminaires with a small physical footprint relative to the illuminated environment.

(i) Luminaire with a Luminaire Module

Figure 1A:
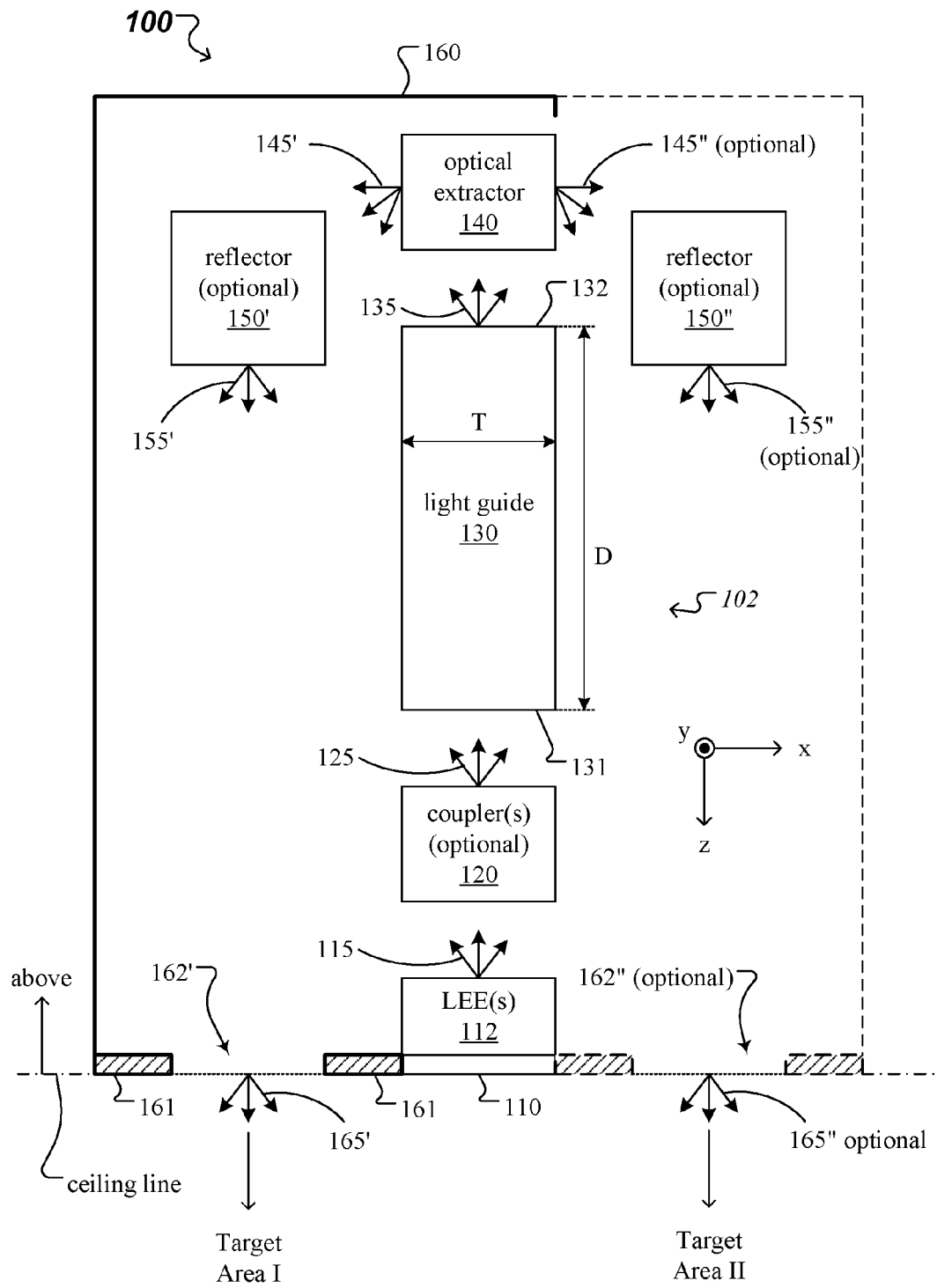
FIG. 1A is a schematic diagram of an example luminaire with a luminaire module disposed within a housing.

FIG. 1A is a schematic diagram of an example luminaire 100 including a luminaire module 102 disposed within a housing 160. A Cartesian coordinate system is shown in FIG. 1A for reference. The housing 160 can be disposed in an in-ceiling or in-wall recessed enclosure to form a recessed fixture. The housing 160 includes a surface 161 with a light output aperture 162'. The luminaire module 102 is disposed inside the housing 160 and adequately mechanically held in place, for example, it may be connected to the surface 161 of the housing 160. The light output aperture 162' of housing 160 faces target area I and is configured such that light output by the luminaire module 102 can pass through the light output aperture 162' toward the target area I. Optionally, the surface 161 of the housing 160 can include another light output aperture 162" facing target area II. The other light output aperture 162" is configured such that light output by the luminaire module 102 can pass through it toward the target area II. Here, light output apertures 162' and 162" are on opposite sides of the optical axis of the luminaire module 102. The luminaire 100 can extend in one or more directions perpendicular to the z-axis, have axial symmetry about different axis or have other geometrical extensions as further described.

Luminaire module 102 includes LEEs 112 that are disposed on a substrate 110. The luminaire module 102 also includes light guide 130, and optical extractor 140.

The substrate 110 can provide any combination of thermal, structural, or electrical functions for the LEEs 112. LEEs 112 emit light in an angular range 115. As used herein, providing light in an "angular range" refers to providing light that propagates in one or more prevalent directions in which each has a divergence with respect to the corresponding prevalent direction. In this context, the term "prevalent direction of propagation" refers to a direction along which a portion of an intensity distribution of the propagating light has a maximum, a mean, a median or other defined direction, for example. For example, the prevalent direction of propagation associated with the angular range can be an orientation of a lobe of the intensity distribution. (See, e.g., FIG. 1B.) Also in this context, the term "divergence" refers to a solid angle outside of which the intensity distribution of the propagating light drops below a predefined fraction of a maximum of the intensity distribution. For example, the divergence associated with the angular range can be the width of the lobe of the intensity distribution. The predefined fraction can be 10%, 5%, 1%, or other values, depending on the lighting application.

Here, the light guide 130 includes side surfaces that extend from a light input surface 131 to a light output surface 132. The light guide 130 is arranged to receive the light emitted by LEEs 112 in angular range 115 at the light input surface 131 of the light guide 130. The received light reflects off the side surfaces of the light guide 130 and mixes within the light guide 130. The mixing can improve luminance and/or color uniformity at the light exit surface 132 of the light guide 130 compared to the light input surface 131. Depth D of the light guide 130 can be selected to achieve adequate uniformity at the light exit surface 132 of the light guide 130. The mixed light is output through the light exit surface 132 with angular range 135 and received by optical extractor 140 that is optically coupled with the light guide 130.

The optical extractor 140 includes redirecting surface(s) that redirect the light received at the optical extractor 140 towards one or more light output surfaces of the optical extractor 140. The optical extractor 140 outputs the redirected light through the one or more light output surfaces in angular range 145', and optionally in angular range 145". The angular ranges 145', 145" can be symmetric or asymmetric and can be modified to have wider or narrower light distributions and peak intensity directions. Light in angular range 145' is directed towards the light output aperture 162'. In some implementations, some or all light within angular range 145' can directly propagate to the light output aperture 162'. In this manner, light output by the luminaire module 102 exits the luminaire 100 through light output aperture 162' towards target area I with an angular range 165'. In implementations, where the optical extractor 140 outputs light in angular range 145", light in angular range 145" is directly or indirectly directed towards the light output aperture 162" in the surface 161 of housing 160. In such implementations, light output by the luminaire module 102 can also exit the luminaire 100 through light output aperture 162" towards target area II with an angular range 165".

In some implementations, luminaire 100 includes a reflector 150'. In some implementations, in addition to the reflector 150', the luminaire 100 includes another reflector 150". Reflectors 150', 150" are disposed within the housing 160 and arranged to redirect at least a portion of the light that is output by optical extractor 140, towards light output apertures 162', 162". For example, reflector 150' can be arranged to redirect light that is output by the optical extractor 140 in angular range 145' towards the light output aperture 162' with an angular range 155'. Reflector 150" can be arranged to redirect light that is output by the optical extractor 140 in angular range 145" towards the light output aperture 162" with an angular range 155". Light received at light output apertures 162', 162" can pass through light output apertures 162', 162" within angular range 165' towards target area I and within angular range 165" towards target area II, respectively.

In some implementations, the luminaire module 102 can include one or more optical couplers 120 that are coupled with corresponding LEEs 112. In such implementations, optical couplers 120 receive light emitted by corresponding LEEs 112 in angular range 115. The optical coupler(s) 120 include one or more solid pieces of transparent material (e.g., glass or a transparent organic plastic, such as polycarbonate or acrylic) having surfaces that are positioned to reflect the received light in the angular range 115 and output light with an angular range 125. In some implementations, the surfaces of the optical coupler(s) 120 are shaped to collect and collimate the received light. The optical couplers 120 are optically coupled with the light input surface 131 of the light guide 130, which receives the light that is output by optical couplers 120.

In elongate implementations, light output apertures 162', 162" can extend along the y-axis over a fraction or the entire length of the surface 161 of the housing 160 panel in the y-direction to allow light to exit from the housing 160 substantially unobstructed. The light output apertures 162', 162" can be openings or can be covered with a light-transmissive window (e.g., glass or plastic). Light-transmissive windows can stop dust, debris, etc. from entering the housing 160 and prevent contaminating the optical components of the luminaire 100 or other system components, for example. The light-transmissive material can be refractively or diffusely transmitting. In the latter case, the light intensity is homogenized along the length of the aperture.

Figure 1B:
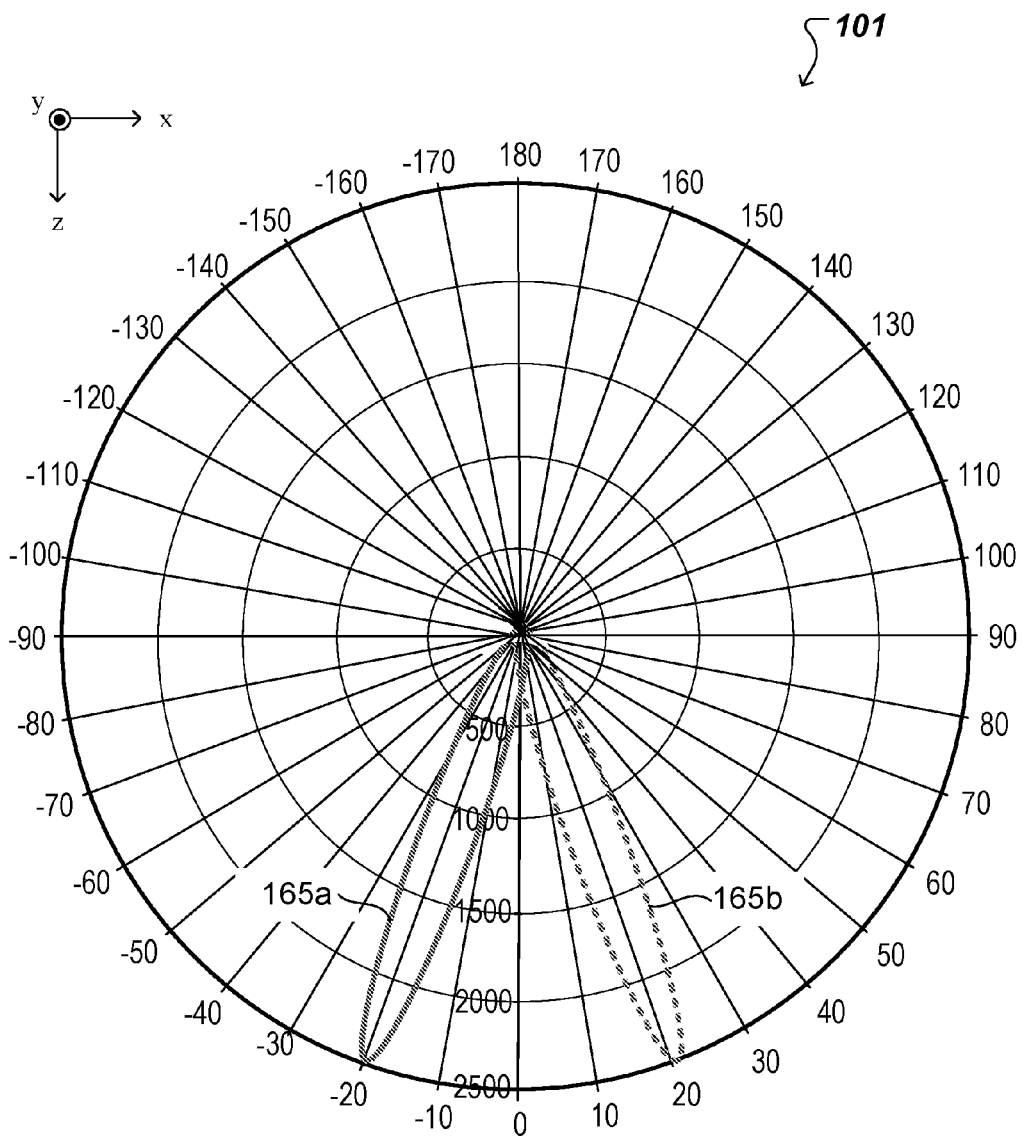
FIG. 1B is a polar plot of an intensity profile of an example luminaire having a housing with one light output aperture, or, optionally, a pair of light output apertures.

FIG. 1B shows, for the x-z plane, a light intensity profile 101 of an example luminaire 100. The intensity profile 101 includes lobe 165a and, optionally, lobe 165b. In this example, lobe 165a corresponds to light that is output by the luminaire 100 in angular range 165' towards target area I. Lobe 165b corresponds to light that is output by luminaire 100 in angular range 165" towards target area II.

Here, the luminaire is configured to direct substantially all of the light represented by lobes 165a, 165b that is output by luminaire 100 in a range of polar angles between −10° and −30°, and +10° and +30°, respectively.

(ii) Luminaire Module

Figure 2A:
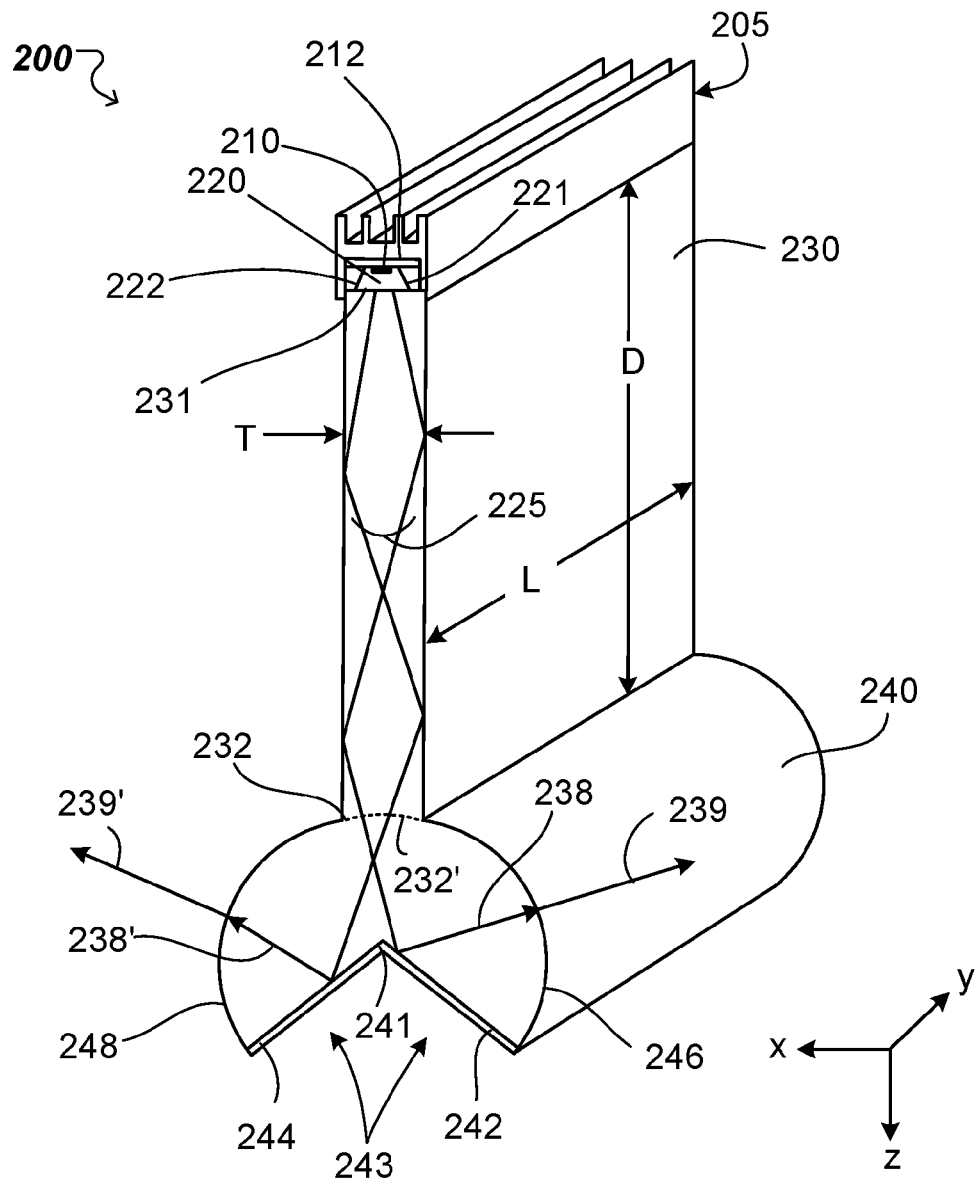
FIG. 2A is a perspective view of an example of an elongated luminaire module (oriented upside down compared to FIG. 1A) with a light guide and a bidirectional optical extractor.

Referring to FIG. 2A, in which a Cartesian coordinate system is shown for reference, an embodiment of a luminaire module 200 includes a substrate 210 having a plurality of LEEs 212 distributed along the substrate 210. The LEEs 212 are disposed at an upper edge 231 of a light guide 230. As shorthand, the positive z-direction is referred to herein as the "forward" direction and the negative z-direction is the "backward" direction. Sections through the luminaire parallel to the x-z plane are referred to as the "cross-section" or "cross-sectional plane" of the luminaire module. Also, luminaire module 200 extends along the y-direction, so this direction is referred to as the "longitudinal" direction of the luminaire module. Lastly, embodiments of luminaire modules can have a plane of symmetry parallel to the y-z plane, be curved or otherwise shaped. Depending on the embodiment, one or more components of the luminaire module can be invariant or variant under translation along the y-axis. This is referred to as the "symmetry plane" of the luminaire module.

Multiple LEEs 212 are disposed on the substrate 210, although only one of the multiple LEEs 212 is shown in FIG. 2A. For example, the plurality of LEEs 212 can include multiple white LEDs. An optical extractor 240 is disposed at lower edge of light guide 232. The LEEs 212 are coupled with one or more optical couplers 220 (only one of which is shown in FIG. 2A).

Substrate 210, light guide 230, and optical extractor 240 extend a length L along the y-direction. Generally, L can vary as desired. Typically, L is in a range from about 1 cm to about 200 cm (e.g., 20 cm or more, 30 cm or more, 40 cm or more, 50 cm or more, 60 cm or more, 70 cm or more, 80 cm or more, 100 cm or more, 125 cm or more, 150 cm or more).

The number of LEEs 212 on the substrate 210 will generally depend, inter alia, on the length L, where more LEEs are used for longer luminaires. In some embodiments, the plurality of LEEs 212 can include between 10 and 1,000 LEEs (e.g., about 50 LEEs, about 100 LEEs, about 200 LEEs, about 500 LEEs). Generally, the density of LEEs (e.g., number of LEEs per unit length) will also depend on the nominal power of the LEEs and luminance desired from the luminaire module. For example, a relatively high density of LEEs can be used in applications where high luminance is desired or where low power LEEs are used. In some embodiments, the luminaire module has an LEE density along its length of 0.1 LEE per centimeter or more (e.g., 0.2 per centimeter or more, 0.5 per centimeter or more, 1 per centimeter or more, 2 per centimeter or more). The density of LEEs may also be based on a desired amount of mixing of light emitted by the multiple LEEs. In embodiments, LEEs can be evenly spaced along the length, L, of the luminaire. In some implementations, a heat-sink 205 can be attached to the substrate 210 to extract heat emitted by the plurality of LEEs 212. The heat-sink 205 can be disposed on a surface of the substrate 210 opposing the side of the substrate 210 on which the LEEs 212 are disposed.

Optical coupler 220 includes one or more solid pieces of transparent material (e.g., transparent glass or plastic, such as polycarbonate or acrylic) having surfaces 221 and 222 positioned to reflect light from the LEEs 212 towards light guide 230. In general, surfaces 221 and 222 are shaped to collect and collimate light emitted from the LEEs. In the x-z cross-sectional plane, surfaces 221 and 222 can be straight or curved. Examples of curved surfaces include surfaces having a constant radius of curvature, parabolic or hyperbolic shapes. In some embodiments, surfaces 221 and 222 are coated with a highly reflective material (e.g., a reflective metal, such as aluminum), to provide a highly reflective optical interface. The cross-sectional profile of optical coupler 220 can be uniform along the length L of luminaire module 200. Alternatively, the cross-sectional profile can vary. For example, surfaces 221 and/or 222 can be curved out of the x-z plane.

The exit aperture of the optical coupler 220 and the adjacent upper edge of light guide 231 are optically coupled. For example, the surfaces of a solid optical coupler and a solid light guide can be attached using a material that substantially matches the refractive index of the material forming the optical coupler 220 or light guide 230 or both. The optical coupler 220 can be affixed to light guide 230 using an index matching fluid, grease, or adhesive. In some embodiments, optical coupler 220 is fused to light guide 230 or they are integrally formed from a single piece of material.

Light guide 230 is formed from a piece of transparent material (e.g., glass or a transparent plastic, such as polycarbonate or acrylic) that can be the same or different from the material forming optical couplers 220. Light guide 230 extends length L in the y-direction, has a thickness uniform T in the x-direction, and a uniform depth D in the z-direction. The dimensions D and T are generally selected based on the desired optical properties of the light guide. During operation, light coupled into the light guide from optical coupler 220 (depicted by angular range 225) reflects off the planar surfaces of the light guide by TIR and mixes within the light guide. The mixing can help achieve illuminance and/or color uniformity at the distal portion of the light guide 232 at optical extractor 240. The depth, D, of light guide 230 can be selected to achieve adequate uniformity at the exit aperture (i.e., at end 232) of the light guide. In some embodiments, D is in a range from about 1 cm to about 20 cm (e.g., 2 cm or more, 4 cm or more, 6 cm or more, 8 cm or more, 10 cm or more, 12 cm or more).

In some implementations, the surfaces of the light guide can include optical structures (e.g., scattering centers) or surface imperfections that can cause light to escape through the surface of the light guide, for example, to create a soft glow.

In general, optical couplers 220 are designed to restrict the angular range of light entering the light guide 230 (e.g., to within +/−40 degrees) so that at least a substantial amount of the light is coupled into spatial modes in the light guide 230 that undergoes TIR at the planar surfaces. In the illustrated example, light guide 230 has a uniform thickness T, which is the distance separating two planar opposing surfaces of the light guide. Generally, T is sufficiently large so the light guide has an aperture at upper surface 231 sufficiently large to approximately match (or exceed) the exit aperture of optical coupler 220. In some embodiments, T is in a range from about 0.05 cm to about 2 cm (e.g., about 0.1 cm or more, about 0.2 cm or more, about 0.5 cm or more, about 0.8 cm or more, about 1 cm or more, about 1.5 cm or more). Depending on the embodiment, the narrower the light guide the better it may mix light. A narrow light guide also provides a narrow exit aperture. As such light emitted from the light guide can be considered to resemble the light emitted from a one-dimensional linear light source, also referred to as an elongate virtual filament.

As discussed previously, length L corresponds to the length of the luminaire and can vary as desired.

While optical coupler 220 and light guide 230 are formed from solid pieces of transparent material, hollow structures are also possible. For example, the optical coupler 220 or the light guide 230 or both may be hollow with reflective inner surfaces rather than being solid. As such material cost can be reduced and absorption in the light guide can be mitigated. A number of specular reflective materials may be suitable for this purpose including materials such as 3M Vikuiti™ or Miro IV™ sheet from Alanod Corporation where greater than 90% of the incident light can be efficiently guided to the optical extractor.

Optical extractor 240 is also composed of a solid piece of transparent material (e.g., glass or a transparent plastic, such as polycarbonate or acrylic) that can be the same as or different from the material forming light guide 230. The optical extractor 240 includes surfaces 242 and 244 and curved surfaces 246 and 248. The surfaces 242 and 244 represent first and second portions of a redirecting surface 243, while the curved surfaces 246 and 248 represent first and second output surfaces of the luminaire module 200.

Surfaces 242 and 244 of luminaire module 200 can be flat and coated with a reflective material (e.g., a highly reflective metal, such as aluminum or silver) over which a protective coating may be disposed. Furthermore, a material with reflectivity properties that can be controlled during operation, for example an electrochromic, electrowetting, liquid crystal or other mirror layer, may be employed. Thus, surfaces 242 and 244 provide a highly reflective optical interface for light entering an input end 232' of the optical extractor 240 from light guide 230.

In the x-z cross-sectional plane, the lines corresponding to surfaces 242 and 244 have the same length and form a v-shape that meets at a vertex 241. In general, the included angle of the v-shape can vary as desired. For example, in some embodiments, the included angle can be relatively small (e.g., from 30° to 60°). In some embodiments, the included angle is in a range from 60° to 120° (e.g., about 90°). The included angle can also be relatively large (e.g., in a range from 120° to 150° or more). In the example implementation shown in FIG. 2A, the output surfaces 246 and 248 of the optical extractor 240 are curved with a constant radius of curvature that is the same for both. Accordingly, luminaire module 200 has a plane of symmetry intersecting vertex 241 parallel to the y-z plane.

The surface of optical extractor 240 adjacent to the lower edge 232 of light guide 230 is optically coupled to edge 232. For example, optical extractor 240 can be affixed to light guide 230 using an index matching fluid, grease, or adhesive. In some embodiments, optical extractor 240 is fused to light guide 230 or they are integrally formed from a single piece of material.

During operation, light exiting light guide 230 through end 232 impinges on the reflective interfaces at portions of the redirecting surface 242 and 244 and is reflected outwardly towards output surfaces 246 and 248, respectively, away from the symmetry plane of the luminaire. The first portion of the redirecting surface 242 provides light having an angular distribution 238 towards the output surface 246, the second portion of the redirecting surface 244 provides light having an angular distribution 238' towards the output surface 246. The light exits optical extractor 240 through output surfaces 246 and 248. In general, the output surfaces 246 and 248 have optical power, to redirect the light exiting the optical extractor 240 in angular ranges 239 and 239', respectively. For example, optical extractor 240 may be configured to emit light upwards (i.e., towards the plane intersecting the LEEs and parallel to the x-y plane), downwards (i.e., away from that plane) or both upwards and downwards. In general, the direction of light exiting the luminaire through surfaces 246 and 248 depends on the divergence of the light exiting light guide 230 and the orientation of surfaces 242 and 244.

Surfaces 242 and 244 may be oriented so that little or no light from light guide 230 is output by optical extractor 240 in directions that are within a certain angle of the forward direction (i.e., in certain angular ranges relative to the positive z-direction). In embodiments where the luminaire module 200 is attached to a ceiling so that the forward direction is towards the floor, such configurations can help avoid glare and an appearance of non-uniform illuminance.

In general, the intensity profile of luminaire module 200 will depend on the configuration of the optical coupler 220, the light guide 230 and the optical extractor 240. For instance, the interplay between the shape of the optical coupler 220, the shape of the redirecting surface 243 of the optical extractor 240 and the shapes of the output surfaces 246, 248 of the optical extractor 240 can be used to control the angular width and prevalent direction (orientation) of the illumination.

In some implementations, the orientation of the illumination can be adjusted based on the included angle of the v-shaped groove 241 formed by the portions of the redirecting surface 242 and 244. In this manner, light can be extracted from the luminaire module 200 in a more forward direction for the smaller of two included angles formed by the portions of the redirecting surface 242, 244.

Furthermore, while surfaces 242 and 244 are depicted as planar surfaces, other shapes are also possible. For example, these surfaces can be curved or faceted. Curved redirecting surfaces 242 and 244 can be used to narrow or widen the beam. Depending on the divergence of the angular range of the light that is received at the input end 232' of the optical extractor 240, concave reflective surfaces 242, 244 can narrow the illumination output by the optical extractor 240, while convex reflective surfaces 242, 244 can widen the illumination output by the optical extractor 240. As such, suitably configured redirecting surfaces 242, 244 may introduce convergence or divergence into the light. Such surfaces can have a constant radius of curvature, can be parabolic, hyperbolic, or have some other curvature.

Figure 2B:
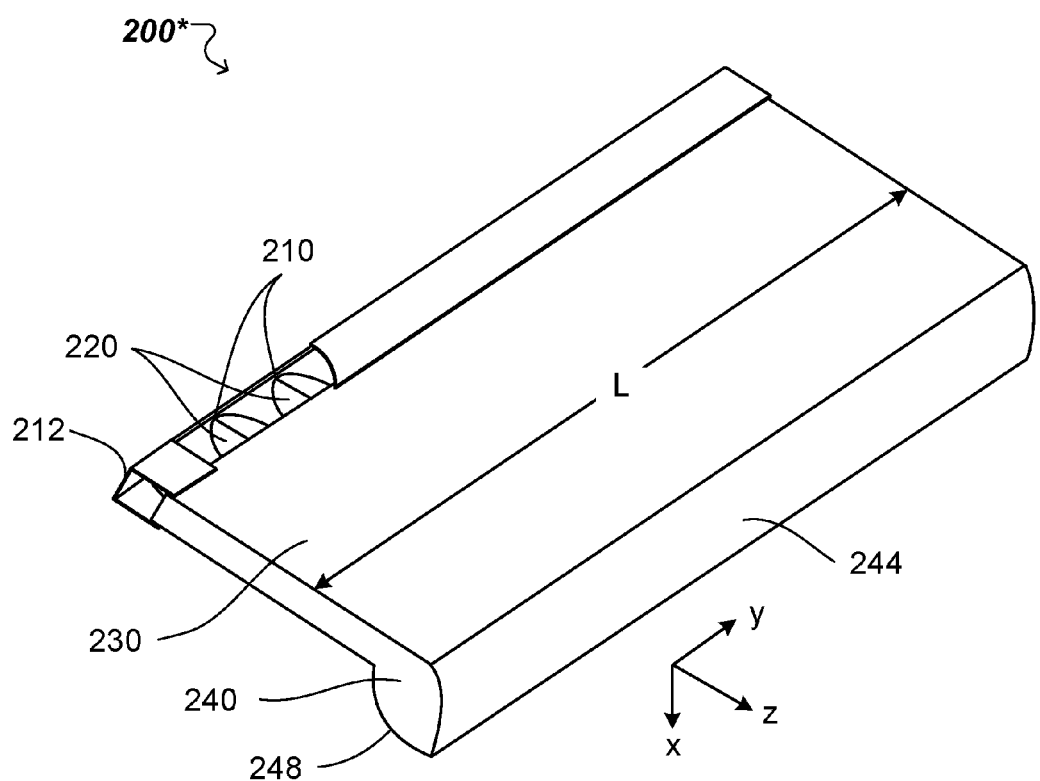
FIG. 2B is a perspective view of an example of an elongated light guide luminaire module with a unidirectional optical extractor.

While the luminaire module 200 as described in FIG. 2A includes an optical extractor 240 with two light output surfaces 246 and 248, a luminaire module can also be configured with one light output surface. FIG. 2B shows an example of luminaire module 200* that is designed to output light in the positive x-direction, but not in the negative x-direction. Luminaire module 200* includes substrate 210, LEEs 212 (e.g., 4, 6, 10, 20, or more) disposed on substrate 210 that are configured to emit light in an emission angular range, and optical couplers 220 coupled with corresponding LEEs. Optical couplers 220 are arranged and configured to redirect (or collimate) the light received from the LEEs into an angular range with a divergence smaller than the divergence of the emission angular range at least in the x-z cross-section.

Luminaire module 200* also includes a light guide 230 and an optical extractor 240. The light guide 230 is optically coupled at a light input surface with the optical couplers 220 and configured to receive light from the optical couplers 220. Light guide 230 guide the received light to a light output surface of the light guide 230. The optical extractor 240 is coupled with the light output surface of the light guide 230 and configured to receive the light that is output by light guide 230.

Optical extractor 240 includes a reflective optical interface 244 and a light exit surface 248. In cross-section, both reflective optical interface 244 and light exit surface 248 are convex (as viewed in the direction of propagation of light) in shape. Light exit surface 248 can have a constant radius of curvature while the radius of curvature of the reflective optical interface 244 can vary. During operation, optical couplers 220 collimate light from LEEs 212 and direct the light to light guide 230. The light propagates down light guide 230 to optical extractor 240, and is, at least in part, redirected by the reflective optical interface 244 and is output through the light exit surface 248. A light intensity profile of luminaire module 200*, disposed in an inverted configuration, can be similar to output lobe 165a shown in FIG. 1B.

Luminaire modules can be used in different orientations, for example upright downward, sideways or in other orientations.

FIG. 2C shows an embodiment 200' of the disclosed luminaire module arranged in an inverted configuration that is elongated along an axis (e.g., y-axis) perpendicular to the forward direction (e.g., along the z-axis.) In this case, a length L of the light guide 230 along the elongate dimension of the luminaire module 200' can be 2', 4' or 8', for instance. A thickness T of the light guide 230 orthogonal to the elongated dimension L (e.g., along the x-axis) is chosen to be a fraction of the distance D traveled by the guided light from the receiving end to the opposing end of the light guide 230. For T=0.05 D, 0.1 D or 0.2 D, for instance, light from multiple, point-like LEEs 212—distributed along the elongated dimension L—that is edge-coupled into the light guide 230 at the receiving end can efficiently mix by the time it propagates to the opposing end.

FIG. 2D shows an embodiment 200" of the disclosed luminaire module arranged in an inverted configuration that has a (e.g., continuous or discrete) rotational symmetry about the forward direction (e.g., z-axis.) Here, a diameter T of the light guide 230 is a fraction of the distance D traveled by the guided light from the receiving end to the opposing end of the light guide 230. For example, the diameter of the light guide 230 can be T=0.05 D, 0.1 D or 0.2 D, for instance.

Other shapes of the disclosed luminaire module are possible. FIGS. 2E and 2F show a perspective view and a bottom view, respectively, of an embodiment 200''' of the disclosed luminaire module (arranged in an inverted configuration) for which the light guide 230 has two opposing side surfaces 230a, 230b that form a closed cylinder shell of thickness T. In the example illustrated in FIGS. 2E and 2F, the x-y cross-section of the cylinder shell formed by the opposing side surfaces 230a, 230b is oval. In other cases, the x-y cross-section of the cylinder shell can be circular or can have other shapes. Some implementations of the example luminaire module 200' may include a specular reflective coating on the side surface 230a of the light guide 230. Open curved shapes are possible.

Luminaire modules, such as luminaire modules 200, 200*, 290, 200', 200", and 200''' as described above with respect to FIGS. 2A-2F, can be employed in a luminaire, such as luminaire 100 as described with respect to FIG. 1A. For example, any of the luminaire modules 200, 200*, 290, 200', 200", and 200''' can be used to provide light that is, at least in part, redirected towards target areas I and/or II.

Figure 3A:
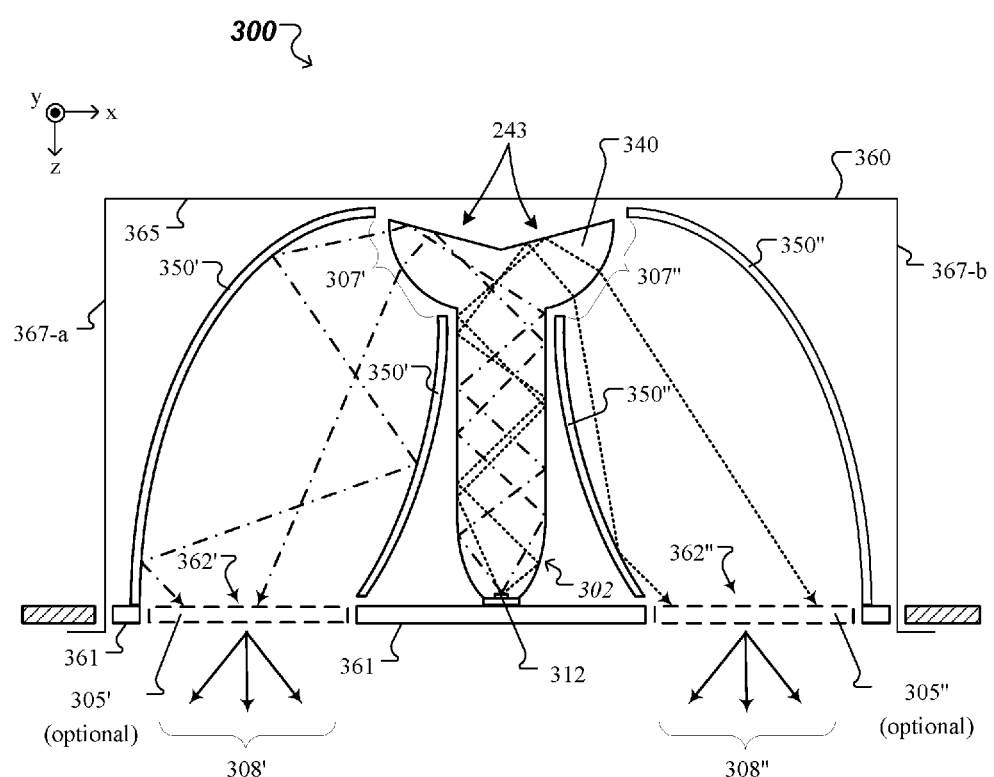
FIGS. 3A-3C show examples of luminaires including a housing encompassing one or more luminaire modules.

(iii) First Implementation of a Luminaire Including a Luminaire Module and Reflectors FIG. 3A shows an example of a luminaire 300 including a housing 360. The luminaire 300 further includes a luminaire module 302 and reflectors 350', 350" disposed within the housing 360.

The housing 360 includes a surface 361 with light output apertures 362' and 362". The luminaire module 302 (which can be any one of luminaire modules 200, 200*, 290, 200', 200″, or 200‴) is connected to the surface 361 of the housing 360 and arranged in an upright position, as described below. The light output apertures 362′ and 362″ are located on opposite sides of an optical axis of the luminaire module 302. In other implementations, the outer components of the reflectors 350′ and 350″ can be integrally formed or otherwise joined and optionally configured to provide a housing and replace a separate housing component.

Luminaire module 302 includes LEEs 312 that are configured to emit light. The luminaire module 302 guides the light emitted by LEEs 312 via a light guide (along the negative z-axis) and redirects the guided light using redirecting surfaces 243 of an optical extractor 340 towards light output surfaces of the optical extractor (with positive z-axis propagation directions), as described above with respect to FIGS. 2A-2F. In some implementations, the redirecting surfaces are configured such that a large portion or substantially all (e.g., more than 99% of) the light that impinges on the redirecting surfaces is redirected towards the light output surfaces of the optical extractor (e.g., the redirecting surfaces can include a high reflectance mirror.) The optical extractor of the luminaire module 302 outputs the redirected light through the light output surfaces of the optical extractor (along the positive z-axis) into the housing 360 in angular ranges 307′ and 307″.

The housing 360 further includes another surface 365, opposing the surface 361, such that the optical extractor 340 of the luminaire module 302 is adjacent the other surface 365. The other surface 365 of the housing 360 can be parallel to the surface 361. In some implementations, the housing 360 includes one or more side surfaces 367-a, 367-b extending along the z-axis between the opposing surfaces 361 and 365. In some implementations, the surfaces 361, 365, 367-a, 367-b of the housing 360 are formed from a metal, e.g., sheet metal. Here, circuitry used to power the LEEs 312 of the luminaire module 302 is insulated from the metal of the housing surfaces. In other implementations, the surfaces 361, 365, 367-a, 367-b of the housing 360 are formed from an insulator material, e.g., plastic, fiber glass, etc.

Reflectors 350′, 350″ receive the light that is output by the luminaire module 302 in the angular ranges 307′, 307″ and redirect at least a portion of the light output by the luminaire module 302 towards apertures 362′ and 362″, respectively. In this example, each of reflectors 350′, 350″ includes first and second opposing reflective surfaces arranged and shaped to reflect components of the light that is output by the luminaire module 302 in angular ranges 307′, 307″. Here, the reflected light can bounce between the first and second reflective surfaces of each of the reflectors 350′ and 350″ as it propagate in a forward direction or directly reach the respective output aperture 362′, 362″. The light received at the light output apertures 362′, 362″ from the reflectors 350′, 350″, respectively, passes through the light output apertures 362′, 362″ and exits the housing 360 of the luminaire 300 with angular ranges 308′ and 308″, respectively.

In some implementations, the light output apertures 362′, 362″ can include an optical window 305′, 305″ that is configured to diffuse the received light symmetrically or asymmetrically to create a desired illumination profile.

Figure 3B:
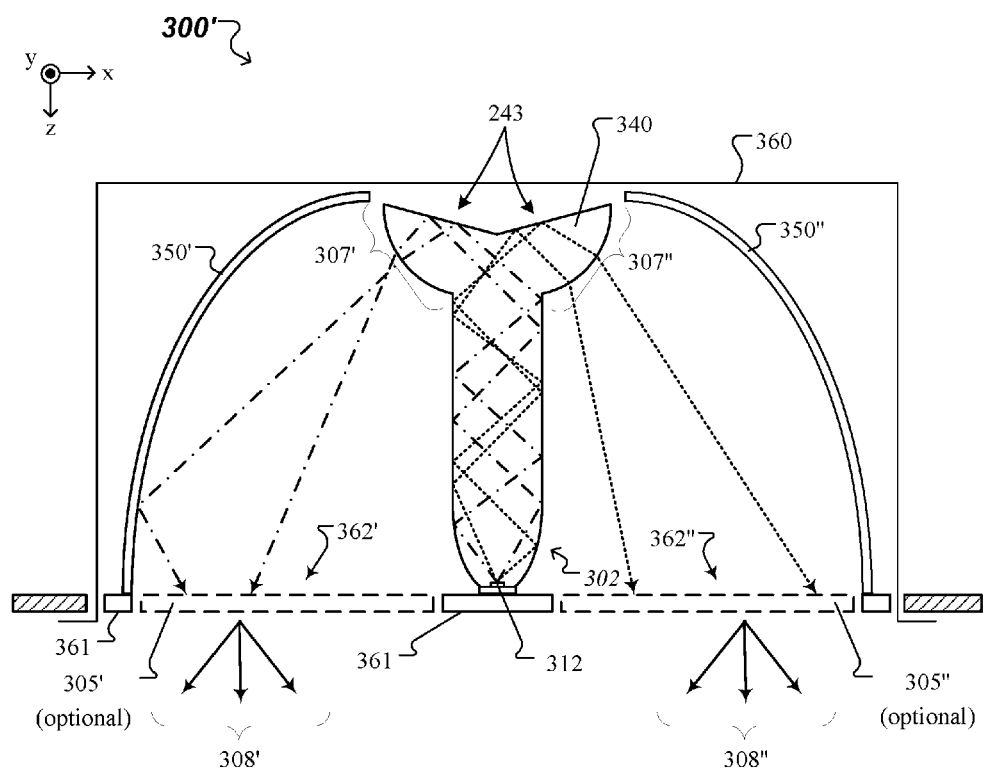

(iv) Second Implementation of a Luminaire Including a Luminaire Module and Reflectors FIG. 3B shows an example luminaire 300′, which is a modification of the luminaire 300 described above in connection with FIG. 3A. Here, each of the reflectors 350′, 350″ includes a first reflective surface arranged and shaped in combination with the configuration of the optical extractor 340 to reflect the light that is output by the luminaire module 302 in the angular ranges 307′, 307″, such that the reflected light reaches the apertures 362′ and 362″, respectively, after a single reflection off of the first reflective surface. In this example, the first surface of the reflector 350′ is configured to reflect a component of the light that is output by the optical extractor 340 of the luminaire module 302 in angular range 307′ that propagates in a lateral direction towards the left side of the luminaire 300′, e.g., along the negative x-axis. Also, the first surfaces of reflector 350″ is configured to reflect a component of the light output by the optical extractor 340 in angular range 307″ that propagates in a lateral direction towards the right side of the luminaire 300′, e.g., along the positive x-axis.

While the housing 360 of luminaire modules 300, 300′ (illustrated in FIGS. 3A and 3B includes reflectors 350′, 350″, luminaire modules having a housing without reflectors are also possible.

Figure 3C:
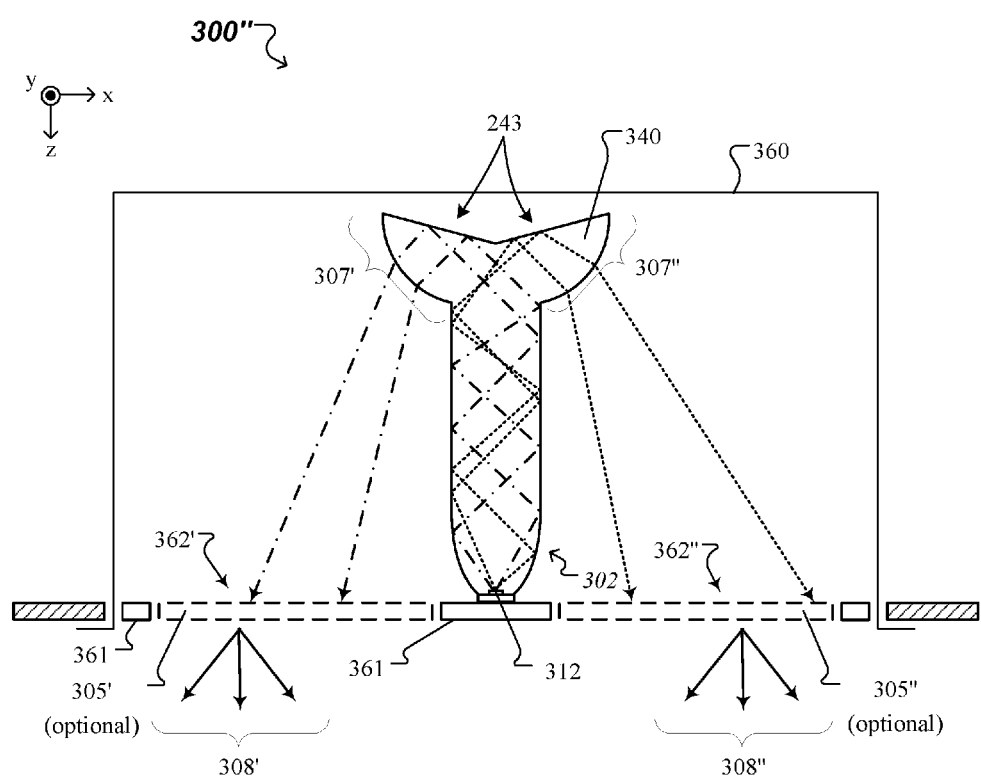

(v) Third Implementation of a Luminaire Including a Luminaire Module and No Reflectors FIG. 3C shows an example of a luminaire 300″, which is a modification of either of luminaires 300 or 300′ described above in connection with FIGS. 3A and 3B. As such, luminaire module 300″ does not include reflectors 350′ and 350″ to redirect light towards apertures 362′, 362″. Alternatively, the luminaire 300″ is an implementation of luminaire 100, such that a housing 360 without reflectors includes a luminaire module 302 within the housing. In this example, light that is output by the optical extractor 340 of the luminaire module 302 in angular ranges 307′, 307″ propagates in forward directions, e.g., along the positive z-axis.

The apertures 362′, 362″ and optical extractor 340 of the luminaire module 302 can be configured such that substantially all the light that is output by the optical extractor exits through the light output apertures 362′, 362″.

Luminaires 300, 300′, and 300″ can be elongated along the y-axis or rotationally symmetric about the z-axis (e.g., about an optical axis of the luminaire module.)

In some implementations, luminaires 300, 300′, and 300″ can be fully or partially recessed in, or surface mounted on, a ceiling or a wall and illuminate one or more target areas below the ceiling or in front of the wall, or provide grazing illumination thereon when partially protruding or surface mounted, for example. The surface 361 of the housing 360 can be within, above, or below a plane of the ceiling/wall. In some implementations, structures that aid in buoyancy driven convective cooling can be incorporated into the ceiling/wall and coupled with the luminaire module 302 to dissipate heat generated by the LEEs 312.

The luminaires 300, 300′ and 300″ described herein in connection with FIGS. 3A-3C can provide light in one or more controlled angular ranges 308′, 308″ that is mixed along a path length that is at least twice the distance from the LEEs 312 to the optical extractor 340. The light is mixed when it propagates within the light guide of the luminaire module 302 and the mixed light that is output by the optical extractor 340 is further mixed within the housing 360 when it propagates from the optical extractor 340 towards the light output apertures 362′, 362″. In some implementations, stray light, if any, within a housing can be partially recycled and mixed using a diffuse reflective interior housing surface.

Additionally, the light exiting the luminaires 300, 300′ and 300″ can have an isotropic spectral composition (i.e., the color of the light does not depend on direction.)

What is claimed is:

1. A luminaire comprising:
   a housing having a first face with a first aperture;
   one or more luminaire modules arranged within the housing, each luminaire module comprising:
   one or more light-emitting elements (LEEs) disposed on one or more substrates and adapted to emit light in a first direction, wherein the one or more substrates are coupled with the first face of the housing;
   a light guide comprising an input end and an output end, and side surfaces extending from the input end to the output end, the side surfaces being shaped to guide light emitted by the one or more LEEs and received at the input end of the light guide in the first direction to the output end of the light guide and provide guided light at the output end of the light guide; and
   an optical extractor optically coupled with the output end of the light guide and adapted to receive the guided light, the optical extractor having a first redirecting surface and a first output surface, the first redirecting surface of the optical extractor being adapted to reflect at least a portion of the guided light received at the optical extractor towards the first output surface and output redirected light from the first output surface of the optical extractor in a second direction opposing the first direction, wherein light output by the optical extractor through the first output surface in the second direction passes through the first aperture into an ambient environment as first light output by the luminaire.

2. The luminaire of claim 1, wherein
   the optical extractor comprises a second redirecting surface and a second output surface on an opposite side of an optical axis of the light guide relative to the first output surface, the second redirecting surface of the optical extractor being adapted to reflect at least a portion of the light received at the optical extractor towards the second output surface and output redirected light from the second output surface of the optical extractor in the second direction, and
   the first face has a second aperture wherein light output by the optical extractor through the second output surface in the second direction passes through the second aperture into the ambient environment as second light output by the luminaire.

3. The luminaire of claim 1, wherein the housing comprises a second face opposing the first face, such that the optical extractor is adjacent to the second face.

4. The luminaire of claim 3, wherein the housing comprises one or more side faces extending from the first face to the second face along the first direction.

5. The luminaire of claim 2, further comprising a first reflector having a first reflective surface, the first reflective surface being configured to reflect at least a portion of light that is output from the first output surface of the optical extractor towards the first aperture in the second direction as reflected light.

6. The luminaire of claim 5, wherein the first reflector comprises a second reflective surface opposing the first reflective surface.

7. The luminaire of claim 1, wherein the housing is recessed in a ceiling such that the first face of the housing is parallel to the ceiling.

8. The luminaire of claim 7, wherein the first face is within a plane of the ceiling.

9. The luminaire of claim 5, further comprising a second reflector having a third reflective surface, the third reflective surface being configured to reflect at least a portion of light that is output from the second output surface of the optical extractor towards the second aperture in the second direction as reflected light.

10. The luminaire of claim 9, wherein the second reflector comprises a fourth reflective surface opposing the third reflective surface.

11. The luminaire of claim 2, further comprising an optical element disposed in at least a portion of at least one of the first or second aperture.

12. The luminaire of claim 11, wherein the optical element is configured to diffuse light.

13. The luminaire of claim 2, further comprising an optical element disposed in at least a portion of at least one of the first or second aperture, the optical element being configured to refract light.

14. The luminaire of claim 9, wherein at least a portion of at least one of the first or third reflective surface is specular reflective.

15. The luminaire of claim 9, wherein the light guide and at least one of the first or third reflectors are configured to mix the light emitted by the one or more LEEs to provide a substantially uniform output light at the first aperture or at the first and second apertures.

16. The luminaire of claim 15, wherein the output light has an isotropic color distribution.

17. The luminaire of claim 15, wherein the output light has a uniform intensity distribution along a direction parallel to planar sides of the light guide.

18. The luminaire of claim 1, wherein the light guide comprises a solid transparent material and the side surfaces are configured to guide light via total internal reflection (TIR).

19. The luminaire of claim 1, wherein the light guide is hollow and the side surfaces are reflectors configured to guide light via specular reflection.

20. A luminaire comprising:
    a housing having a first face with a first aperture;
    one or more luminaire modules arranged within the housing, each module comprising:
    one or more light-emitting elements (LEEs) disposed on one or more substrates and adapted to emit light in a first direction;
    one or more couplers positioned to receive a portion of the light emitted by corresponding one or more LEEs and adapted to at least partially collimate the received portion of the light;
    a light guide comprising an input end and an output end, and side surfaces extending from the input end to the output end, the one or more couplers being positioned to provide collimated light to the input end of the light guide, and the side surfaces of the light guide being shaped to guide light emitted by the one or more LEEs and received at the input end of the light guide in the first direction to the output end of the light guide and provide guided light at the output end of the light guide; and
    an optical extractor optically coupled with the output end of the light guide and adapted to receive the guided light, the optical extractor having a first redirecting surface and a first output surface, the first redirecting surface of the optical extractor being adapted to reflect at least a portion of the guided light received at the optical extractor towards the first output surface and output redirected light from the first output surface of the optical extractor in a second direction opposing the first direction, wherein light output by the optical extractor through the first output surface in the second direction passes through the first aperture into an ambient environment as first light output by the luminaire.

21. The luminaire of claim 20, further comprising an optical element disposed in the first aperture, the optical element being configured to refract light.

22. The luminaire of claim 20, further comprising a first reflector having a first reflective surface, the first reflective surface being configured to reflect at least a portion of light that is output from the first output surface of the optical extractor towards the first aperture in the second direction as reflected light.

23. The luminaire of claim 22, wherein at least a portion of the first reflective surface is specular reflective.

24. The luminaire of claim 22, wherein the light guide and the first reflector are configured to mix the light emitted by the one or more LEEs to provide a substantially uniform output light at the first aperture.

* * * * *